Feb. 24, 1959  H. W. STIEGLITZ  2,875,319
WELDING MACHINE
Filed June 14, 1957  3 Sheets-Sheet 1

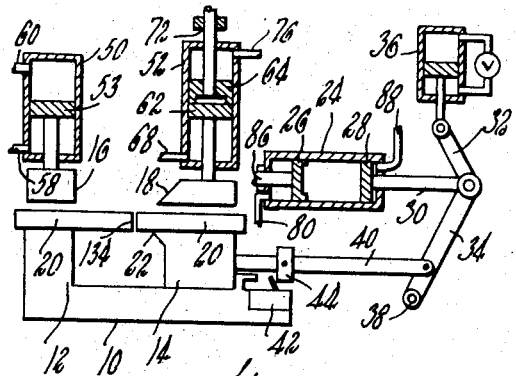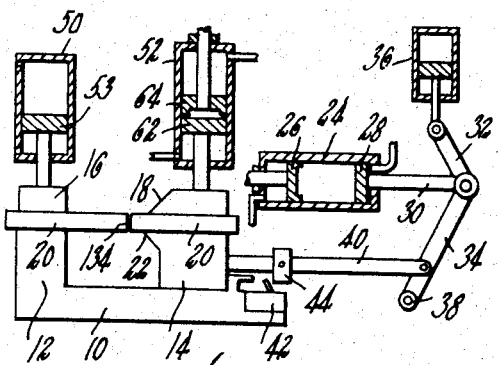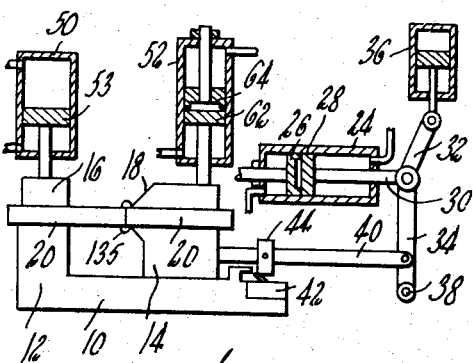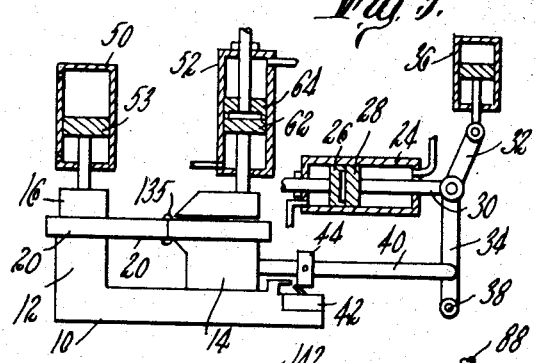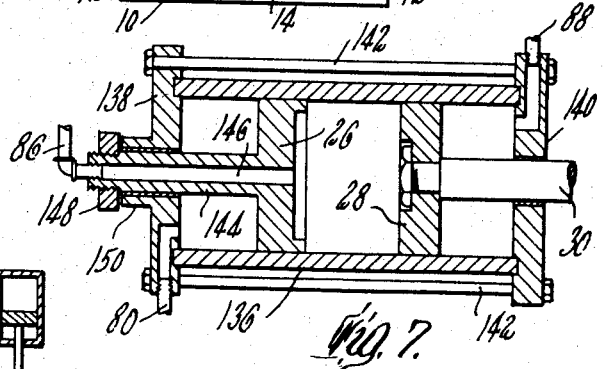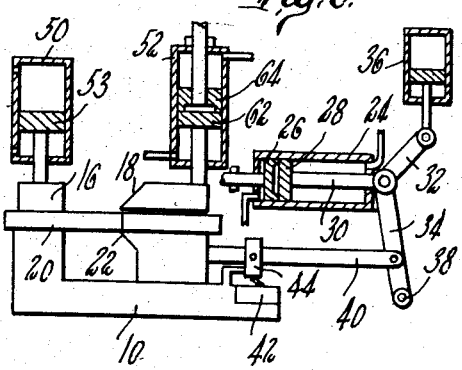

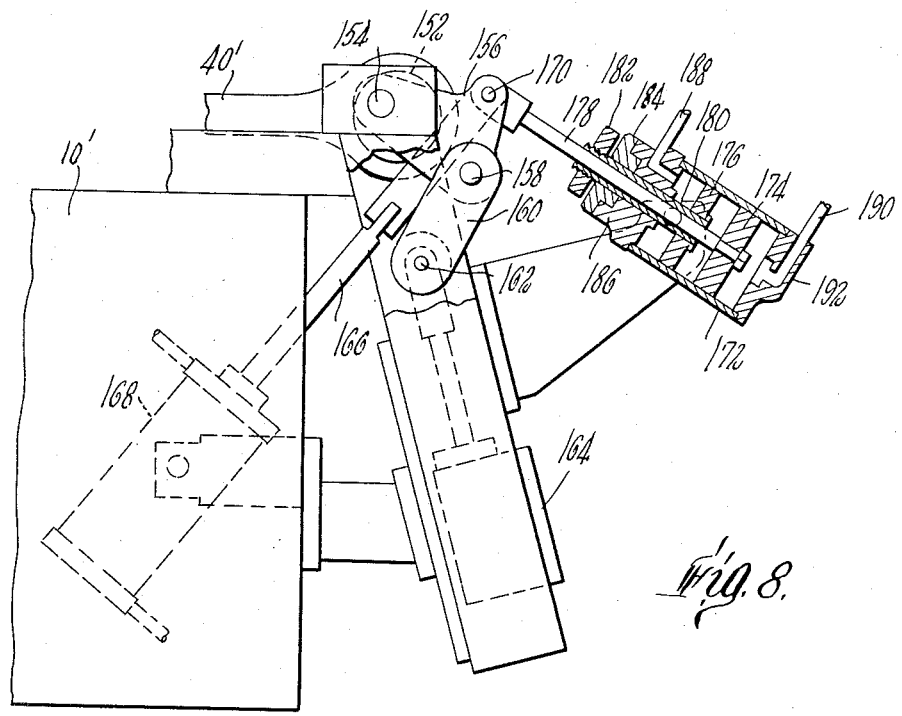
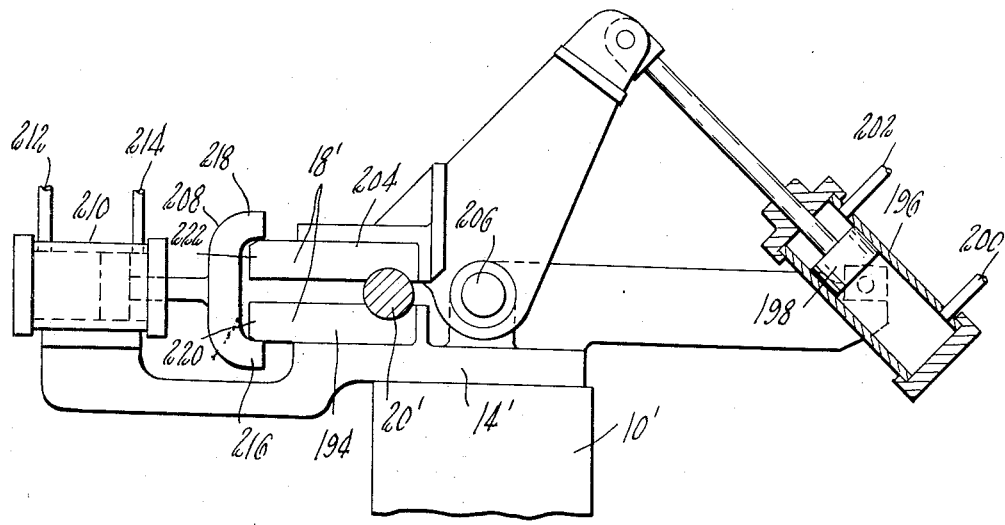

United States Patent Office 2,875,319
Patented Feb. 24, 1959

2,875,319

WELDING MACHINE

Hermann W. Stieglitz, Marblehead, Mass., assignor to Thomson Electric Welder Company, Lynn, Mass., a corporation of Massachusetts Application June 14, 1957, Serial No. 665,881

9 Claims. (Cl. 219—101)

This invention relates to flash-butt welding machines and more particularly to such welding machines incorporating means for removing automatically as a function of the machine cycle the flash or upset metal produced by the welding operation.

In the flash-butt welding process, an electric arc is first drawn between adjacent surfaces of the workpieces clamped in the welding machine to heat such surfaces and thereafter, the workpieces are moved together with substantial force to complete the weld. The force so applied, however, also displaces metal outwardly from the area of the weld around the periphery thereof and this excess metal, generally called "flash" or "upset" metal, forms a raised surface around the weld and must be removed. Conventionally, this is accomplished by grinding, chipping or other means as a distinct operation, or by providing a cutting or shearing member on the welding machine itself operative to remove the upset metal from the weld area while the workpieces remain clamped in the machine. This latter member, however, though convenient, requires the use of an additional member interposed between the welding clamps which prevents support of the workpieces as close to the weld as is desirable.

Accordingly, it is an object of the present invention to provide, in a welding machine, means for incorporating an upset removing cycle as a successive operation to the welding cycle. This has been accomplished by providing a novel welding machine and control system therefor including an upset removing or shearing member which preferably forms a portion of one of the clamping mechanisms. The control system operates the machine so that, upon completion of the welding portion of the machine cycle as by contacting a stop and cutting off the welding current, the clamping mechanism having the shearing member associated with it will be opened automatically a predetermined but slight distance while maintaining clamping pressure on the other clamping mechanism to maintain positioning support for the welded workpieces. The stop is then automatically removed so that the resulting further advance of the clamping mechanisms toward one another will operate to shear or otherwise remove the "flash" or "upset" metal from the weld.

Another object of the invention is to provide welding machine control apparatus which sequentially performs the welding and shearing operations in timed relation such that the upset metal may be removed a predetermined interval after the weld is completed.

It is a feature of the present invention that the automatic removal of the upset is carried out while the welded workpieces are still supported in the welding machine clamping mechanisms and while their temperature is in an optimum range for such operation to produce an accurately dimensioned finished weld. Thus, welding machines according to the present invention are particularly well adapted to mass production methods and to automatic welding equipments. Furthermore, conventional welding machines may readily be modified to take advantage of the invention.

Further objects and features of the invention will become apparent from the following description of a preferred embodiment and modifications thereof, together with the accompanying drawings in which:

Fig. 2 is a diagrammatic view of the welding machine, the clamping pistons and actuating mechanism associated therewith, with unclamped workpieces placed in the welding machine prior to welding;

Fig. 3 is a view of the apparatus of Fig. 2 with the workpieces clamped;

Fig. 4 is a view of the apparatus of Fig. 2 with the workpieces welded together;

Fig. 5 is a view of the apparatus of Fig. 2 with the clamp associated with the shearing mechanism in unlocked position, preparatory to the shear-off operation;

Fig. 6 is a view of the apparatus of Fig. 2 after the shear-off operation;

Fig. 7 is a sectional view of a type of fluid motor utilized in the preferred embodiment of the invention;

Fig. 8 is a diagrammatic illustration of a modified actuating mechanism suitable for use with a welding machine incorporating the principles of the invention; and Fig. 9 is an illustration of a modified clamping structure.

Figure 1:
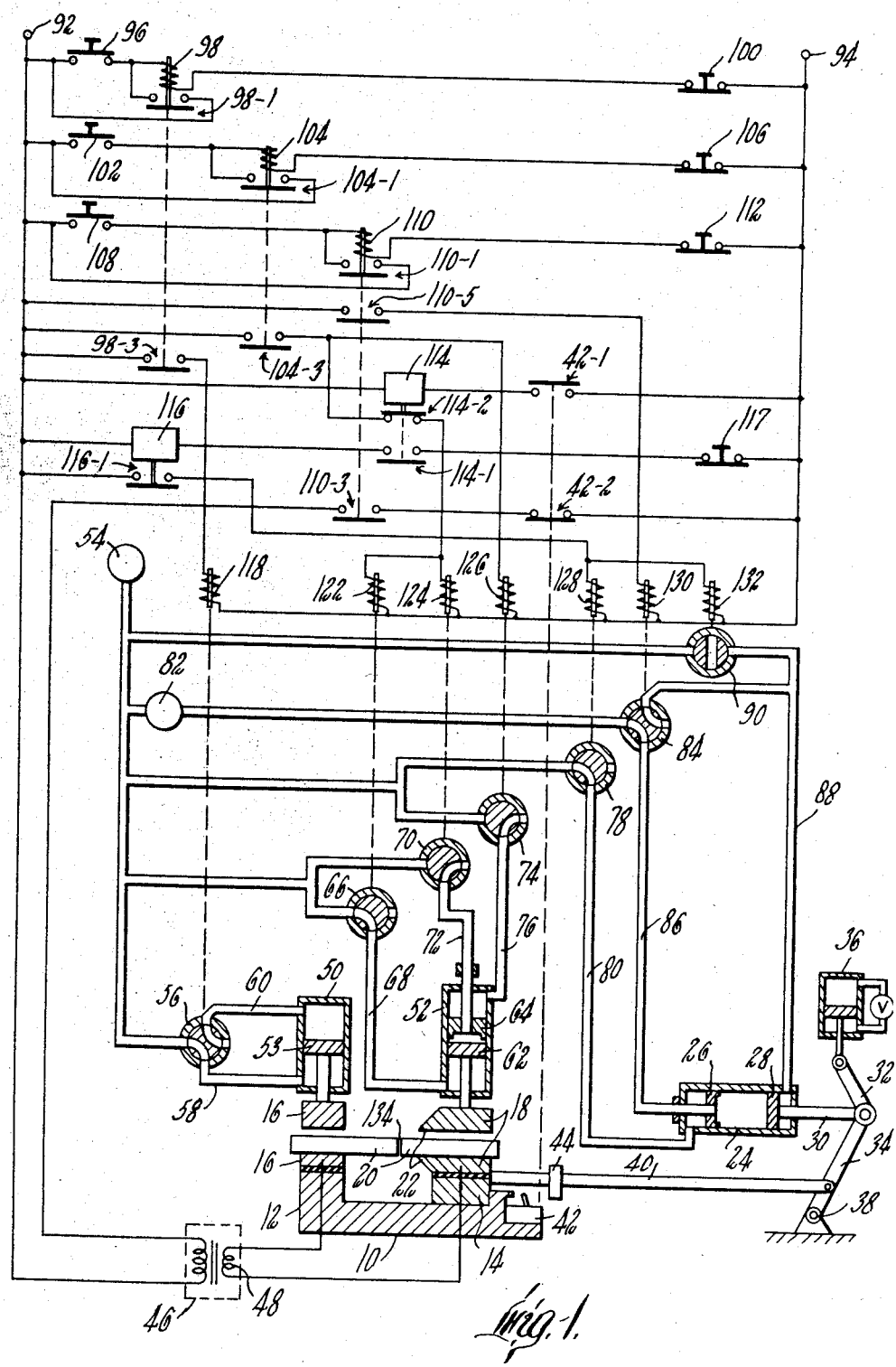
Fig. 1 is a schematic diagram of the welding machine of the invention and its control system including the hydraulic and electrical circuitry of the preferred embodiment of the invention.

With reference to Fig. 1, the welding machine has a base 10 upon which are mounted an insulated fixed platen 12 and an insulated movable platen 14. Each of the platens 12, 14 has a clamping structure 16, 18 respectively, consisting of an upper jaw and a lower jaw, for clamping the pieces of work 20 to be welded. The jaws of clamping structure 18 include shearing portions 22 which are adapted to remove upset metal from the area of the weld.

For operation thereof the fixed clamp 16 has a single piston cylinder 50 associated therewith and the movable clamp 18 has a two piston cylinder 52, best shown in Fig. 7 and hereinafter described, associated with it.

The movable platen 14 is actuated by a hydraulic motor mechanism which is adapted to provide, (1) a controlled forward movement during the flash off, (2) a more rapid forward movement and a relatively quick-pushup to bring the workpieces 20 together to produce the weld and simultaneously produce an upset of the adjacent ends of the pieces 20 and (3) a subsequent advance across the weld area of the clamping structure 18 with its shearing portions 22 to remove the upset. The mechanism includes a hydraulic cylinder 24 with two pistons 26, 28 therein, as shown in Fig. 7 and described hereinafter. The piston rod 30, attached to the piston 28, is connected to a toggle mechanism, consisting of two links 32, 34, at the pivot connection between links 32 and 34. The second end of link 32 is connected to a snubbing mechanism 36 and the second end of link 34 is connected to a fixed pivot point 38. The main operating rod 40 is attached to the link 34 at an intermediate point thereon and to the movable platen 14. A limit switch 42, mounted on the base 10 is operated by a trip device 44 mounted on the rod 40. Suitable welding current is supplied to the welding machine by a welding transformer 46 having one terminal of its secondary winding 48 connected to the fixed platen 12 and the other terminal connected to the movable platen 14.

The welding machine is illustrated in the retracted, unclamped position in Fig. 1, and the hydraulic circuitry will be initially described in such condition. The fixed platen clamping cylinder 50 is divided by piston 53 into two chambers. The lower chamber is connected to a source of hydraulic pressure 54 through a solenoid operated four way valve 56 and line 58 and the upper chamber is connected to the atmosphere through the solenoid valve 56 and line 60. The movable platen clamping cylinder 52 is divided by pistons 62 and 64 into three chambers. The lower chamber is connected to source 54 through a solenoid operated three way valve 66 and line 68, the middle chamber connected to the atmosphere through three way valve 70 and line 72, and the upper chamber is connected to the atmosphere through a solenoid operated three way valve 74 and line 76. The platen operating cylinder 24 is divided into three chambers by pistons 26 and 28. The left chamber is connected to the source 54 through a solenoid operated three way valve 78 and line 80, the intermediate chamber is connected to source 54 through regulator 82, a solenoid operated four way valve 84 and line 86, and the right chamber is connected to the atmosphere through valve 84 and line 88. Line 88, in addition, is connected to a solenoid operated two way valve 90.

The solenoids associated with these valves are connected in parallel across lines 92 and 94. Each solenoid is in series with one or more pairs of contacts of timing and/or control relays. All the electrical control circuitry for the welding machine is connected to a suitable source by lines 92 and 94.

In this description the contacts associated with a relay coil are designated by the coil's reference number and an additional number to designate the set of contacts. An odd number is used for normally open contacts and an even number for normally closed contacts. For example, contacts 110–3 are a set of normally open contacts associated with coil 110.

The fixed platen clamping control circuit includes a normally open push button 96, a control relay coil 98 and a normally closed push button 100, in series across lines 92 and 94. Contacts 98–1 are in parallel with push button 96. The movable platen clamping control circuit includes a normally open push button 102, a control relay coil 104 and a normally closed push button 106, in series across lines 92 and 94. Contacts 104–1 are in parallel with push button 102. The platen advancing control circuit includes a normally open push button 108, a control relay 110 and a normally closed push button 112, in series across lines 92 and 94. Contacts 110–1 are in parallel with push button 108. The welding current control circuit includes the primary winding of transformer 46, contacts 110–3 and contacts 42–2 of the limit switch 42, in series across lines 92, 94. A first timing relay 114 is connected in series with contacts 42–1 of the limit switch and a second timing relay 116 is connected in series with contacts 114–1 and a normally closed push button 117.

The solenoids associated with the hydraulic valves are connected in parallel across lines 92, 94. Solenoid 118, operating valve 56, is connected in series with contacts 98–3. Solenoid 122, operating valve 66, is connected in series with contacts 104–3 and 114–2. Solenoid 124, operating valve 70, is connected in series with contacts 104–3 and 114–2. Solenoid 126, operating valve 74, is connected in series with contacts 104–3. Solenoid 128, operating valve 78, is connected in series with contacts 116–1. Solenoid 130 operating valve 84, is connected in series with contacts 110–5. Solenoid 132, operating valve 90, is connected in series with contacts 116–1.

The welding and shear off cycle of the apparatus in this embodiment is diagrammatically illustrated in Figs. 2–6 and operates in the following manner. The workpieces 20 are placed in the platens 12, 14 with their adjacent edges 134 separated a predetermined distance as shown in Figs. 1 and 2. The fixed platen clamping structure 16 is actuated by the depression of push button 96 which energizes relay coil 98 and closes contacts 98–1 (to complete the holding circuit across push button 96) and contact 98–3 energizing solenoid coil 118. The energization of coil 118 operates valve 56 to connect line 60 to hydraulic source 54 and line 58 to the atmosphere. The piston 53 is driven downward, actuating the clamping structure 16 to secure one of the workpieces 20 in the platen 12. The movable platen clamping structure 18 is actuated by push button 102 which energizes relay 104, closing contacts 104–1 (to complete the holding circuit across push button 102) and contacts 104–3 energizing solenoid coils 122, 124 and 126. The energization of coil 122 operates valve 66 to connect line 68 to the atmosphere; the energization of coil 124 operates valve 70 to connect line 72 to the hydraulic source 54; and the energization of coil 126 operates valve 74 to connect line 76 to hydraulic source 54. The pistons 62, 64 are driven downward, actuating the clamping structure 18 to secure the second workpiece 20 in the platen 14. There is pressure in the intermediate chamber (between pistons 62 and 64) such that the pistons 62, 64 are spaced apart. (The details of this cylinder may be better understood with reference to the similar cylinder shown in Fig. 7 and described hereinafter.) The clamping structures in this position is shown in Fig. 3.

The platen movement cycle is initiated by the depression of push button 108 which energizes coil 110, closing contacts 110–1 (to complete the holding circuit across push button 108) contacts 110–3 and contacts 110–5. The primary circuit of the welding current transformer 46 is completed by the closing of contacts 110–3 and the welding voltage is impressed on the output terminals of the transformer secondary 48. The advance of the movable platen 14 is initiated by the energization of solenoid coil 130 through the closing of contacts 110–5. The energization of coil 130 operates valve 84 to connect line 86 to the atmosphere and line 88 to the source 54 through the low pressure regulator 82. Piston 28 is driven to the left actuating the toggle mechanism and advancing the movable platen 14 through the links 32, 34 and rod 40. The movable platen 14 advances at a relatively slow rate as controlled by the snubbing mechanism 36 during the flash off. During this period an arc is initiated across the adjacent surfaces 134 of the workpieces 20 to heat these surfaces in preparation for welding. After the toggle linkage passes dead center the workpieces 20 are driven together at a more rapid rate to form a weld as the snubbing mechanism no longer impedes the movement of the toggle. The travel is arrested by the removable stop provided by piston 26 and thus the amount of the resulting upset is controlled by the position of piston 26. (This operation is described in greater detail hereinafter in connection with Fig. 7.) The position of the clamps and driving mechanism at this time is as diagrammed in Fig. 4.

At some point during the flash off, and upset welding cycle the limit switch 42 is operated by the stop 44 to open contacts 42–2, deenergizing the primary of the transformer 46 to turn off the welding current, and to close contacts 42–1 to energize the time relay 114. After a short time delay of approximately 1–5 seconds to allow the temperature of the weld to be reduced, the relay 114 operates to close contacts 114–1 and to open contacts 114–2. The closing of contacts 114–1 energizes time relay 116 and the opening of contacts 114–2 deenergizes solenoid coil 122 and 124. The deenergization of coil 122 operates valve 66 to connect line 68 to source 54 and the deenergization of coil 124 operates valve 70 to connect line 72 to the atmosphere. Piston 62 is driven toward piston 64 which forms a removable stop at a point as diagrammed in Fig. 5. This operation opens the clamping structure 18 a slight amount (approximately 0.010 inch) to permit movement of platen 14 relative to the welded workpieces while maintaining positioning support for the welded pieces. After an appropriate time delay, as determined by relay 116 to insure the opening of the clamping structure 18, the relay 116 operates to close contacts 116–1 energizing solenoid coils 128 and 132. The energization of coil 128 operates valve 78 to connect line 80 to the atmosphere and the energization of coil 132 operates valve 90 to connect line 88 to the source 54. This operation removes the stop provided by piston 26. Pistons 26 and 28 are then driven to the left and the toggle mechanism advances, driving the shearing portions 22 of the movable platen clamp structure 18 into and through the upset metal 135. During this shearing action the welded pieces 20 remain secured in place by clamping structure 16. The excess metal surrounding the weld is thus quickly and easily removed in an automatic process as a portion of the machine cycle. The position of the clamping and platen driving mechanisms at this time is as shown in Fig. 6. After the shearing operation has been completed the time delay relay 116 may be deenergized by depressing push button 117 to open contacts 116–1 and deenergize solenoid coils 128 and 132. The deenergization of coil 128 operates valve 78 to connect line 80 to the source 54 and the deenergization of coil 132 operates valve 90 to disconnect line 88 from the high pressure source. Line 88 remains connected to the lower pressure source through valve 84.

The fixed clamping structure 16 is opened by the depression of push button 100 which deenergizes coil 98 and opens contacts 98–1 to interrupt the holding circuit and contacts 98–3 to deenergize solenoid coil 118. The deenergization of coil 118 operates valve 56 to connect line 60 to the atmosphere and line 58 to the hydraulic source 54. Piston 53 is driven upward, opening the clamping structure 16. The movable clamp is completely opened by the depression of push button 106 which deenergizes coil 104, opening contacts 104–1 to interrupt the holding circuit and contacts 104–3 to deenergize solenoid coil 126. The deenergization of coil 126 operates valve 74 to connect line 76 to the atmosphere. The pistons 62, 64 are driven upward, opening the clamping structure 18. The movable platen 14 is retracted by the depression of push button 112 which deenergizes coil 110, opening contacts 110–1 to interrupt the holding circuit, contacts 110–3 (in the primary of transformer 46) and contacts 110–5, deenergizing solenoid coil 130. The deenergization of coil 130 operates valve 84 to connect line 86 to the source 54 through the low pressure regulator 82 and line 88 to the atmosphere. Piston 28 is driven to the right driving the toggle mechanism back across dead center and resetting the platen 14.

The welding machine is thus reset to the position shown in Fig. 2 ready to commence another welding and shear cycle. The movable platen actuating mechanism 24 and the movable platen clamping mechanism 52 are similar fluid motors each having two pistons therein. Each mechanism provides a removable positioning stop. In the actuating mechanism 24 the stop is provided by piston 26 to control the longitudinal dimension of the welded workpieces 20 and the amount of upset metal 135 resulting from the welding operating. This stop is removed after the weld is completed and before the shearing action is instituted. In the clamping mechanism the stop is provided by piston 64 to control the permissible amount of unclamping of the workpiece secured in the movable platen 14 after the workpieces have been welded and before the platen 14 is advanced relative to the workpieces to remove the upset metal 135.

Details of the platen actuating motor 24 are shown in Fig. 7. The motor comprises a cylinder 136 and two cylinder heads 138, 140 which are fastened together by a plurality of studs 142, circumferentially located about the motor, passing through heads 138 and 140. There are two pistons 26, 28 within the cylinder. The actuating piston rod 30 is attached to piston 28. The piston rod 144, attached to piston 26, has a longitudinal passageway 146 which extends through the piston 26 and provides communication with the chamber between the pistons 26, 28. Threaded on piston rod 144 is a nut 148 which coacts with stop 150, mounted on cylinder head 138, to provide a positioning means for piston 26. The cylinder 136 is divided into three chambers by the two pistons 26, 28. Fluid pressure is admitted to the left chamber, defined by the head 138 and piston 26, through line 80 which is connected to head 138; to the center chamber, defined by the two pistons, through flexible line 86 which is threadedly connected to rod 144 and is in communication with passageway 146; and to the right chamber, defined by piston 28 and head 140, through line 88 which is threadedly connected to head 140.

In operation the pistons are initially separated as shown in Fig. 7 and pressure is applied to the left and center chambers through lines 80 and 86. In the welding operation (and similarly in the initial unclamping in cylinder 52), the central chamber is exhausted to atmospheric pressure and fluid pressure is applied to the right chamber through line 88. Piston 28 is driven toward piston 26, its travel being terminated when it contacts that piston which acts as a positioning stop for piston 28 and the associated rod 30. In the shearing operation (or the complete unclamping in cylinder 52) the left chamber is exhausted through line 80, thus removing the stop provided by piston 28. Both pistons then move to the left.

Other means for providing this removable stop are illustrated in Figs. 8 and 9, a modified platen advance mechanism being illustrated in Fig. 8 and a modified clamp mechanism being illustrated in Fig. 9.

With reference to the modified platen advance mechanism of Fig. 8, the platen advancing rod 40' is journalled on an eccentric shaft 152 which is mounted for rotation about center 154. The toggle mechanism consists of a link 156 between center 154 and center 158 and a link 160 between center 158 and center 162. A snubber 164, similar to snubbing mechanism 136, is connected to link 160 at center 162. The piston rod 166 of the advancing motor 168 is attached to link 156 at point 170 and is pivotally mounted on the base 10' of the welding machine. This mechanism is suitable for operating the platen of a conventional flash-butt welding machine. The platen advance is provided by the rotation of shaft 152 (a part of the toggle link 156) about center 154. While the toggle is approached dead center in the flash-off operation the snubber 164 is operative to counteract the force provided by the motor 168. After the toggle passes dead center the snubber 164 ceases to oppose the force of the motor 168 and the platen advances more rapidly to produce the weld and upset. In the conventional welding machine a mechanical stop (not shown) is provided to limit the advance of the platen after the welding has been accomplished in order to provide a controlled degree of upset.

In a modified machine incorporating a shearing mechanism, this mechanical stop is omitted and a "removable stop" is provided. In this modification, a side view of which is illustrated in Fig. 8, this stop is provided by a pivotally mounted pneumatic cylinder 172. The cylinder 172 has two pistons 174, 176 which have coaxial piston rods 178, 180 respectively.

In operation, air pressure is initially introduced through line 188 and drives piston 176 to the right until the positioning nut 182 abuts stop 184. The actuating motor 168 drives rod 166 downward, rotating link 156, including point 170, about center 154. Piston 174 moves freely within cylinder 172 as the toggle mechanism operates until it contacts piston 176 at which time the weld and upset have been completed. Piston 176 is utilized to provide a temporary stop which prevents the further rotation of link 156.

After the appropriate time delay, to permit the chilling of the weld and the releasing of the movable platen clamp the stop is removed by applying air pressure through line 190 and exhausting air through line 188. This drives both pistons 174, 176 to the left and assists the actuating motor 168 to advance the movable platen and drive the shearing portions through the upset metal.

A modified removable stop structure for use with the movable platen clamping structure is shown in Fig. 9 with the removable stop in operating position. A workpiece 20′ to be welded is illustrated in the lower jaw 194 of the clamping structure 18′ associated with the movable platen 14′. In this embodiment the movable platen clamping cylinder 196 is a pivotally mounted pneumatically operated single piston cylinder. Clamping pressure is exerted when air pressure is admitted to the lower side of piston 198 through line 200 and the clamp is released by admitting air pressure to the upper side of piston 198 through line 202. Clamping action results from the pivoting of the upper clamping jaw 204 about the center 206.

The removable stop is provided by a mechanical positioning means having internal positioning surfaces in the form of a C shaped stop member 208 which surfaces have a predetermined internal dimension. When appropriately positioned the stop member permits the clamping structure 18′ to be opened only a predetermined limited amount. Although the illustrated stop member has a fixed internal dimension this dimension may be made adjustable to accommodate different sizes of workpieces if desired. The stop member 208 is laterally positioned by the pneumatic cylinder 210. When the air pressure is greater on line 212 than on line 214 stop member 208 is driven to the right into the operative position and when the air pressure is greater on line 214 the stop member 208 is driven to the left into the inoperative position.

The stop mechanism operates as follows. Pressure, admitted to cylinder 196 through line 200, drives the piston 198 upward to clamp the workpiece 20′ between the jaws 194, 204. The stop member 208 is then driven to the right such that ends 216, 218 overlap the extremities 220, 222 of the jaws 194, 204 respectively. In this position there is approximately 0.010 inch clearance between end 218 and the extremity 222 of jaw 204. The actuating mechanism then advances the platen 14′ through the flash-off and upset welding cycle and is located as determined by the removable stop associated with that mechanism. The clamp is then actuated by the movement of piston 198 in cylinder 196 downward in the unclamping direction. However, the movement of jaw 204 is limited by stop member 208 at a position sufficient to permit the platen 14′ to be moved relative to the workpiece 20′, to produce the shear-off. After the upset metal has been removed air is admitted to cylinder 210 through line 214 and the stop member is withdrawn permitting the clamping structure 18′ to be fully opened for removal of the welded workpiece 20′.

The principles of the invention have been described in relation to the preferred embodiment of a flash-butt welding machine and in relation to certain suitable modifications in prior art machines which did not include mechanisms for the upset removing cycle. It will be understood that while there have been shown and described herein certain preferred embodiments, the invention is not intended to be limited thereby or to all details thereof, and departures may be made therefrom within the spirit and scope of the invention as set forth in the appended claims.

I claim:

1. A flash-butt-welding machine including a pair of relatively movable platens each having a current carrying clamp for holding a workpiece to be welded, said clamps being movable between a closed position for clamping said work and an open position for removal of said work, and one of said clamps having an intermediate position in which it is opened a predetermined limited distance from said workpiece, fluid motor means for advancing said platens relatively toward one another, including removable stop means for arresting the advance of said platens relatively toward one another upon completion of welding of said workpieces, control means operable upon said arresting of the advance of said platens to open said one clamp said predetermined limited distance while maintaining clamping pressure on the other clamp, and upon said opening of said one clamp releasing said stop means for further advance of said platens relative to said workpiece while maintaining positioning support for said workpiece.

2. A flash-butt-welding machine as claimed in claim 1 wherein said one clamp has a pair of extremities adapted to coact with a mechanical positioning means having internal positioning surfaces for determining said intermediate position.

3. A flash-butt-welding machine including a pair of relatively movable platens each having a current carrying clamp for holding a workpiece to be welded, said clamps being movable between a closed position for clamping said work and an open position for removal of said work, and one of said clamps having an intermediate position opened a predetermined limited distance from said workpiece, fluid motor means for advancing said platens relatively toward one another to weld workpieces held by said clamps, including removable stop means for arresting the advance of said platens relatively toward one another upon completion of welding of said workpieces, means operable by advance of said platens to cut off welding current through said clamps and to complete welding of said workpieces, control means operable upon the advance of said platens to complete said weld to open said one clamp said predetermined limited distance while maintaining clamping pressure on the other clamp, and upon said opening of said one clamp releasing said stop means for further advance of said platens relative to said workpiece while maintaining positioning support for said workpiece.

4. A flash-butt-welding machine as claimed in claim 3 wherein said fluid motor means comprises a cylinder and two pistons, a first of said pistons being connected to one of said platens and the second of said pistons being adapted to be positioned to provide said removable stop.

5. A flash-butt-welding machine as claimed in claim 3 wherein said control means further includes time delay means effective to delay release of said stop means for a predetermined time after completion of said weld.

6. A flash-butt-welding machine as claimed in claim 3 wherein said one clamp includes removable stop means operable by said control means, said removable stop means normally arresting movement of said one clamp to open said one clamp for said predetermined limited distance.

7. A flash-butt-welding machine as claimed in claim 3 wherein said fluid motor means includes a main pushup cylinder and an auxiliary pushup cylinder including said removable stop means.

8. A flash-butt-welding machine as claimed in claim 7 wherein said auxiliary pushup cylinder includes two pistons, one of said pistons being adapted to be adjustably positioned, said pistons adapted to coact to provide said removable stop.

9. A flash-butt-welding machine including a pair of relatively movable platens each having a current carrying clamp for holding a workpiece to be welded, an upset removing means associated with one of said platens, advancing means for moving said platens relatively toward one another, a stop mechanism associated with said advancing means to locate said platens relative to one another at a position after the welding of said workpieces is accomplished and before said upset removing means is actuated to remove the upset produced by said weld, means to remove said stop to permit said advancing means to actuate said upset removing means, and means associated with the clamp of one of said platens to unclamp one of said workpieces sufficiently to permit the movement of said clamp relative to said workpiece while maintaining positioning support for said workpiece.

References Cited in the file of this patent

UNITED STATES PATENTS

| 2,124,849 | Drain | July 26, 1938 |
| 2,302,420 | Chapman | Nov. 17, 1942 |

FOREIGN PATENTS

| 456,326 | Great Britain | Nov. 6, 1936 |